Patented Aug. 21, 1934

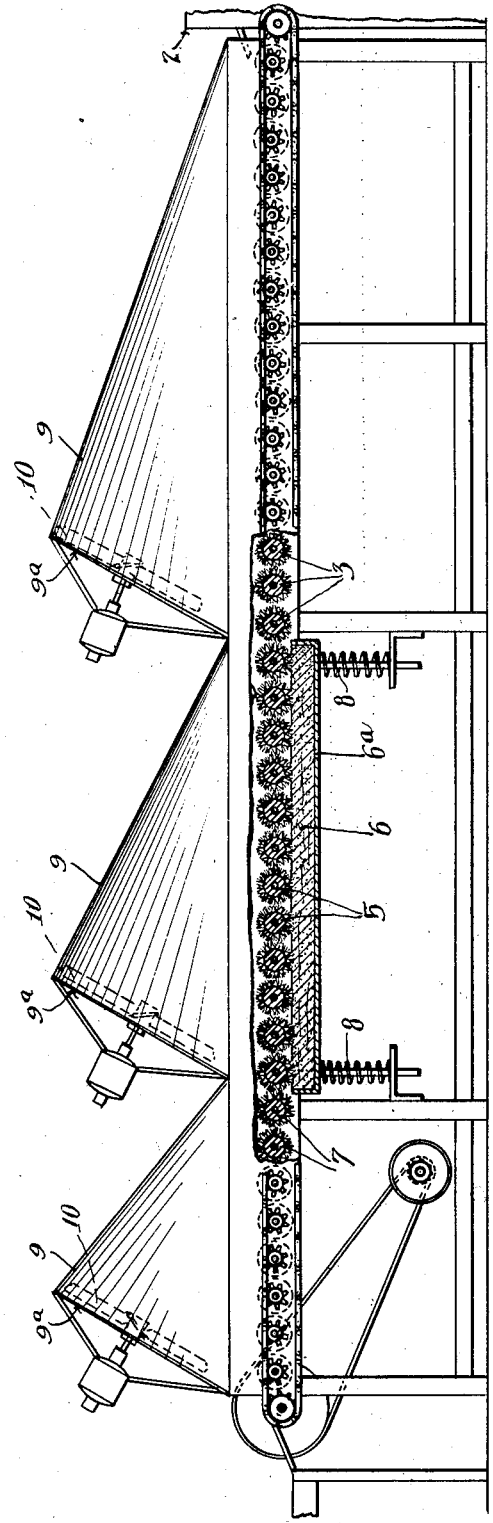

1,970,861

UNITED STATES PATENT OFFICE 1,970,861

PROCESS AND MACHINE FOR TREATING CITRUS FRUIT

John R. MacRill, Whittier, and Frank H. Walker, Pasadena, Calif., assignors to California Fruit Growers Exchange, Los Angeles, Calif., a corporation of California Application October 24, 1930, Serial No. 490,898

5 Claims. (Cl. 91—37)

This invention relates to a process of treating fruit such as citrus fruit and refers particularly to a process for applying a material of waxy nature or like covering composition to the fruit for the purpose of partially retarding evaporation of the fruit without interfering with the production of a polished fruit.

In marketing fruit such as citrus fruit, it is generally necessary to treat the fruit with an alkaline solution either for the purpose of cleaning the fruit or retarding the growth of mold spores on the fruit. This treatment of the fruit to a partial extent at least dulls the appearance of the fruit. This treatment also has a tendency to increase the rate of evaporation of the fruit when the fruit is stored or during transit of the fruit to market.

Various coatings of material of waxy nature have been applied to fruit after treatment for the purpose of retarding or preventing evaporation. Experience has proven that a heavy, continuous film of waxy material is unsatisfactory in practice for the reason that the fruit upon storage or shipment will deteriorate in flavor and become pitted.

The art has had difficulty in applying a satisfactory amount of waxy material to the fruit in a simple and economical manner without interfering with the high polish which it is desired to place on the fruit.

It is the general object of the present invention to provide a process of treating fruit whereby a polished fruit is obtained having just sufficient waxy material on the rind to satisfactorily retard evaporation, which process is simple and economical in character and requires the use of a minimum amount of apparatus.

The application of the waxy material to citrus fruit has been attempted in a process in which the waxy material is dissolved in a volatile solvent like kerosene or gasoline.

The citrus fruit, in a dry condition, is then first brushed to polish the fruit and the fruit then subjected to a brushing action in the presence of a spray of the solution of waxy material. Afterwards the fruit was further brushed and spread with waxy material. Treatment of the fruit in this manner resulted not only in a fruit which contained an excessive amount of wax but also a fruit which possessed a poor appearance. Later, waxes had been applied to citrus fruit in a solid condition by heating and spraying the wax in a molten condition upon the fruit and then brushing and polishing the fruit. The apparatus for applying wax in this manner is expensive and costly in operation.

We have discovered that a highly satisfactory method of applying wax to fruit while securing a highly polished fruit can be obtained simply by first passing the fruit to be polished and waxed over a number of moving polishing brushes of any preferred or customary type. After the fruit has been sufficiently brushed in order to possess a polished appearance it may then be further brushed by brushes in contact with a solid wax to be applied to the fruit, which brushes will thereupon pick up and spread over the polished fruit a satisfactory or sufficient amount of waxy material.

To secure the uniformity of appearance of the fruit and insure the appearance of a fully polished fruit, after leaving the brushes which are in contact with the solid waxy material, preferably then passes over a number of additional polishing brushes wherein any excess waxy material is brushed from the fruit and wherein the wax applied to the fruit is more uniformly distributed upon the fruit.

The present invention, together with various objects and advantages of the same, will best be understood from a description of the preferred form or example of a process of treating fruit which embodies the invention. For this purpose, the process is hereinafter described with reference to the accompanying drawing, in which The figure represents diagrammatically a suitable apparatus.

In the preferred process fruit such as citrus fruit may be first washed for the removal of scale or other foreign matter. For this purpose a solution of alkaline material such as soap powder or washing powders may be employed.

Following the washing treatment, the fruit may be thereafter subjected to the action of a solution especially intended for the purpose of retarding or inhibiting the development of mold spores such, for example, as solutions of sodium hypochlorite, sodium bicarbonate, borax or blue stone, although in certain cases the mold inhibiting action of the ordinary washing powders and soap powders may be sufficient. After the treatment of the fruit with a solution with either the washing fluid or the additional solution of mold inhibiting agent, when one is employed, the greater part of such solution or solutions is then preferably rinsed from the fruit and the fruit dried. In certain cases it will be desirable to brush the fruit with one or both of the solutions thereon before drying the fruit.

After the fruit has been dried the fruit is then passed, as indicated in the drawing, from the drier 2 down a chute or other suitable member into a polishing apparatus which may be of the enclosed type, if desired.

In the polishing apparatus there is preferably provided a number of brushes 3 which are mounted on axes transverse to the passage of fruit. While we prefer a polisher to which the axes of the brushes is transverse to the passage of the fruit, any usual type of polisher brush may be used such, for example, as the well known type in which the axes of the brushes are parallel to the line of operation of the fruit. The brushes are preferably hair brushes and each alternate brush provided with a spiral groove for the purpose of turning the fruit and assisting in feeding the fruit through the polishing operation. The brushes may be operated at any desired speed, for example, with a brush five inches in diameter a speed of 100 to 300 R.P.M. has been found satisfactory. The first group of brushes which contact with the fruit serve merely for the purpose of imposing upon the fruit a high polish. For example, in one commercial installation we have passed the fruit over sixteen brushes which serve solely for the purpose of polishing the fruit. A further group of twelve similar brushes 5 is then provided in the apparatus for the purpose of applying a waxy material in solid form to the fruit, and for this purpose a solid bar or slab of waxy material 6, or a number of bars or slabs of waxy material are pressed against the brushes, preferably against the undersides of the brushes, by any suitable means, such as, the holder 6a which is supported on springs 8.

On these twelve brushes of the machine a sufficient amount of wax is brushed from the solid slabs by the brushes and spread upon the fruit to provide a satisfactory means for retarding evaporation of the fruit. It appears that when a limited amount of wax of solid nature is applied in this manner upon the fruit which has been previously polished, a polished fruit is immediately obtained. However, we preferably then pass the fruit over a further group of brushes 7, for example, eight in number, which serve the purpose of removing any waxy powder from the fruit and otherwise insures the production of polished fruit having a uniform deposit of wax over the surface.

An important feature of the present invention is the placing upon the fruit of only sufficient wax as will retard evaporation to a partial extent and on the other hand will not interfere with the production of a polished fruit. The application of too great a coating of wax to a fruit not only produces a fruit which will spoil in shipment to the market due to the fact that the fruit cannot properly breathe, but also a thick coating of waxy material produces fruit of a dull appearance and frequently, the wax coating cracks, leaving a noticeable white deposit of wax appearing on the fruit. We prefer to apply sufficient wax to the fruit to cut the evaporation to from 50 to 80% of the amount of evaporation which takes place in unwaxed fruit.

The amount of wax which will be placed upon the fruit in the process depends upon the temperature of the atmosphere, the pressure existing between slabs of wax and the brushes and the number of brushes which are engaging the wax slab. In ordinary atmospheric temperatures we have found the use of a paraffin wax of a melting point of 125 to 128° F. is suitable, although we have used harder waxes including mixtures of paraffin wax with Carnauba wax. In cases where the atmospheric temperature falls so low that difficulty is secured in spreading the wax, slightly warm air may be passed to the polishing brushes through the opening 9a in the hood 9 of the polisher. In place of a single opening for the addition of warmed air a number of such openings may be provided in which air is introduced by means of fans 10. In certain cases, it may be desired to operate the fans 10 even without introducing warm air for the purpose of using the polishing and waxing apparatus as a means for securing additional drying of the fruit and for the purpose of blowing off from the fruit any excess treating material or any powdery wax deposit from the fruit.

While the particular process and apparatus herein described is well adapted to carry out the objects of the present invention, it is to be understood that various modifications and changes may be made without departing from the present invention, and the invention includes all such modifications and changes as come within the scope of the appended claims.

We claim:

1. A process of treating citrus fruit which comprises passing dry fruit through a path in contact with brushing surfaces sufficient to polish the surface of the fruit, and then passing the fruit through a further portion of said path and while the brushing action continues, and in said further portion of the path, applying a limiting amount of a solid waxy material to brushes in contact with the fruit so as to retard evaporation of the fruit while at the same time not substantially interfering with the polishing of the fruit.

2. A process of treating citrus fruit which comprises passing dry fruit through a path in contact with brushing surfaces sufficient to polish the surface of the fruit, and then passing the fruit through a further portion of said path and while the brushing action continues, and in said further portion of the path, applying a limited amount of a solid waxy material to brushes in contact with the fruit so as to retard evaporation of the fruit while at the same time not substantially interfering with the polishing of the fruit, and then passing the fruit through a further portion of said path in which the fruit is maintained in contact with brushing surfaces and there brushing the fruit after the application of the solid waxy material by brushes which are free of wax except that derived from the fruit itself.

3. A process of treating fruit which comprises passing dried fruit down a brushway, in the first part of which brushway the fruit is brushed until a polish is secured on the fruit and in an intermediate part of the brushway applying solid waxy material to the brushes so as to thereby spread waxy material upon the fruit to a limited extent such as will not seriously interfere with the polished condition of the fruit, and in the final passage of the fruit down the brushway additionally brushing the fruit without supplying wax to the brushing elements and in contact with the fruit except as the same is carried over from the wax applying brushes.

4. A process of treating fruit which comprises first washing and drying the fruit, then passing the fruit down a brushway in the first part of which the fruit is brushed without substantial contact with waxy material so as to secure a polished fruit, then applying solid wax to intermediate brushes in contact with the fruit sufficient to spread upon the fruit waxy material to partially retard evaporation without materially interfering with the previous polished appearance of the fruit, and thereafter further brushing the fruit with brushes which are without substantial contact with waxy material.

5. An apparatus for treating fruit which comprises a brushway consisting of a plurality of polishing brushes mounted on parallel axes which are transverse to the runway of the fruit, means for revolving the brushes, a holder for solid wax-like material, and means for pressing said holder against the undersides of certain intermediate brushes in said runway, the apparatus thus providing at the front end of the runway a plurality of brushes which have no contact with the wax, and a plurality of brushes at the end of the runway which have no contact with the wax in said wax-holder.

JOHN R. MacRILL.
FRANK H. WALKER.